Figure 1:
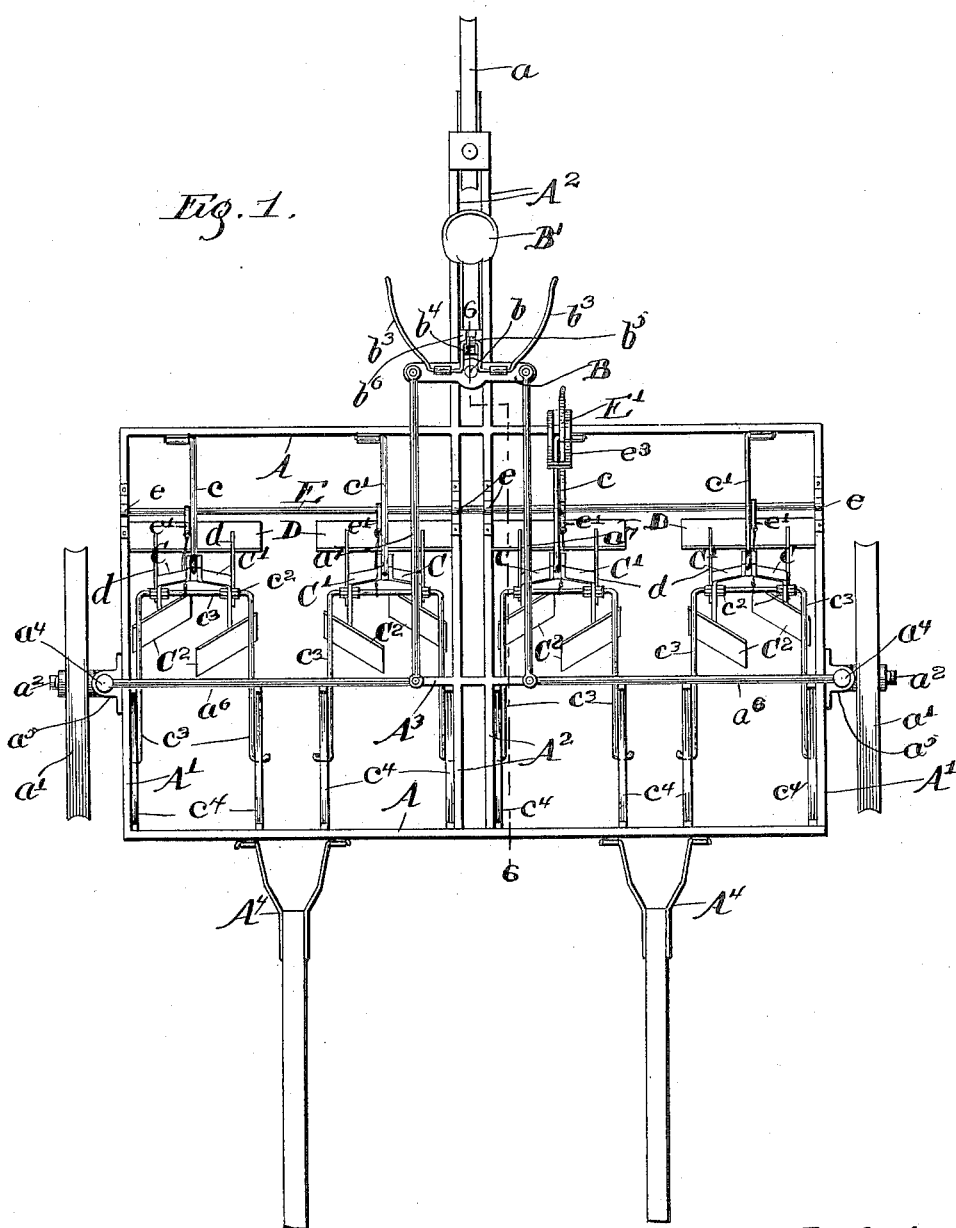

(No Model.) 3 Sheets—Sheet 1.

C. F. POGUE.
CULTIVATOR.

No. 599,401. Patented Feb. 22, 1898.

Witnesses:
Chas. O. Hervey,
Robert O. Bailey.

Inventor:
Cyrus F. Pogue
By Wiles Warner Bitner
His atty.

(No Model.) 3 Sheets—Sheet 2.
C. F. POGUE.
CULTIVATOR.
No. 599,401. Patented Feb. 22, 1898.
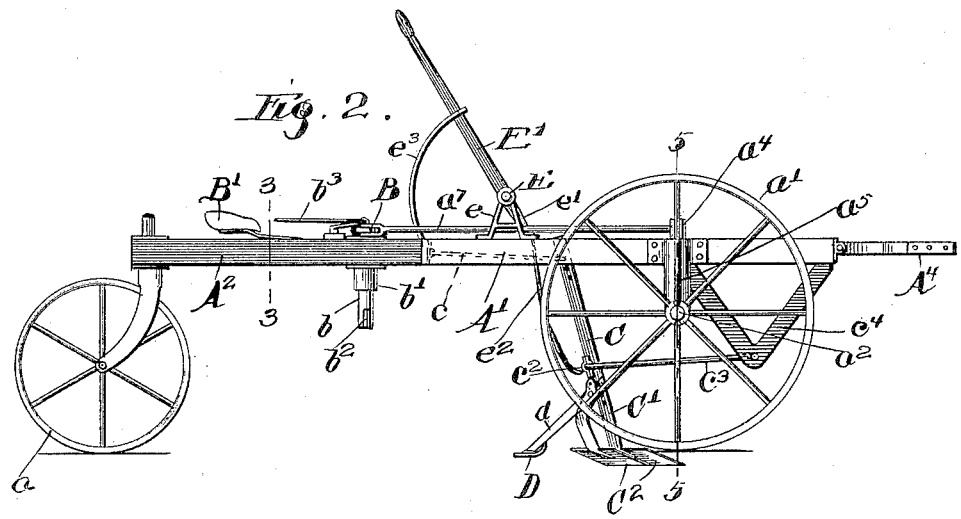
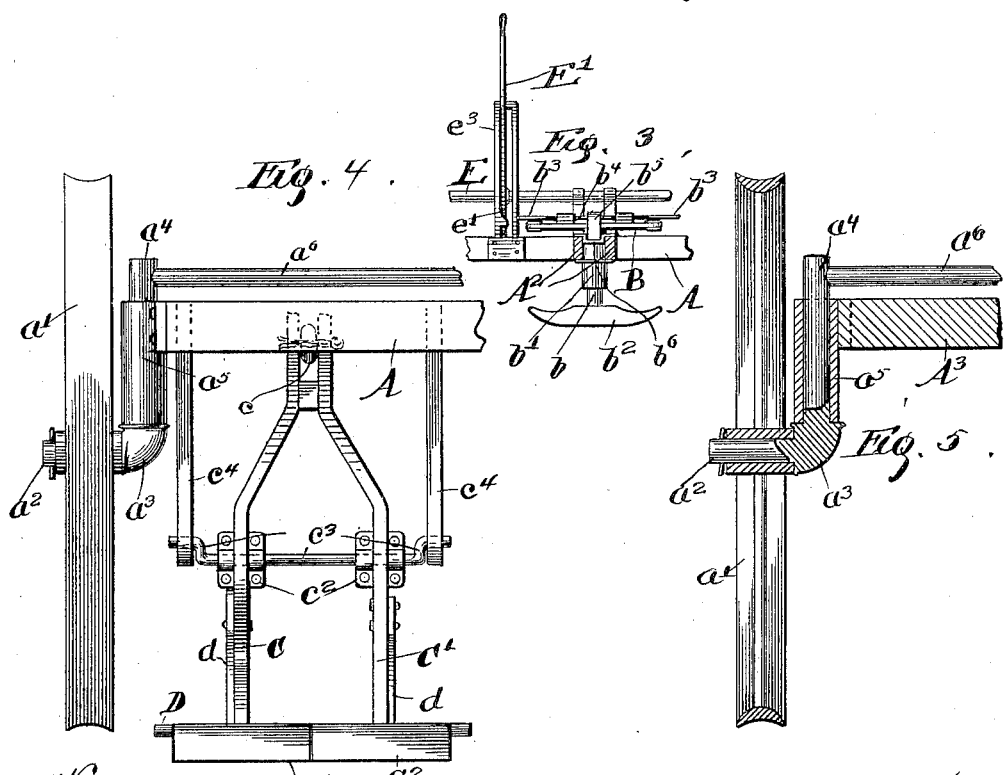
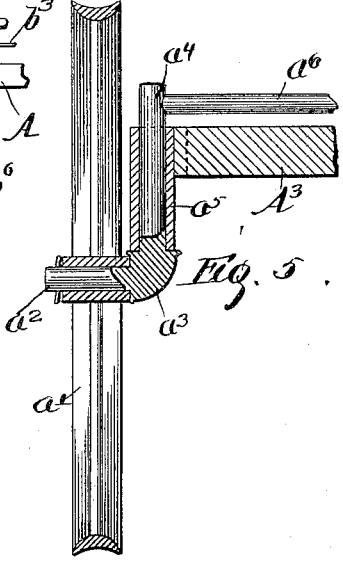
Witnesses:
Chas. O. Shervey
Robert O. Bailey
Inventor:
Cyrus F. Pogue
by Miles Warner Bitun
His attys (No Model.) 3 Sheets—Sheet 3.
C. F. POGUE.
CULTIVATOR.
No. 599,401. Patented Feb. 22, 1898.
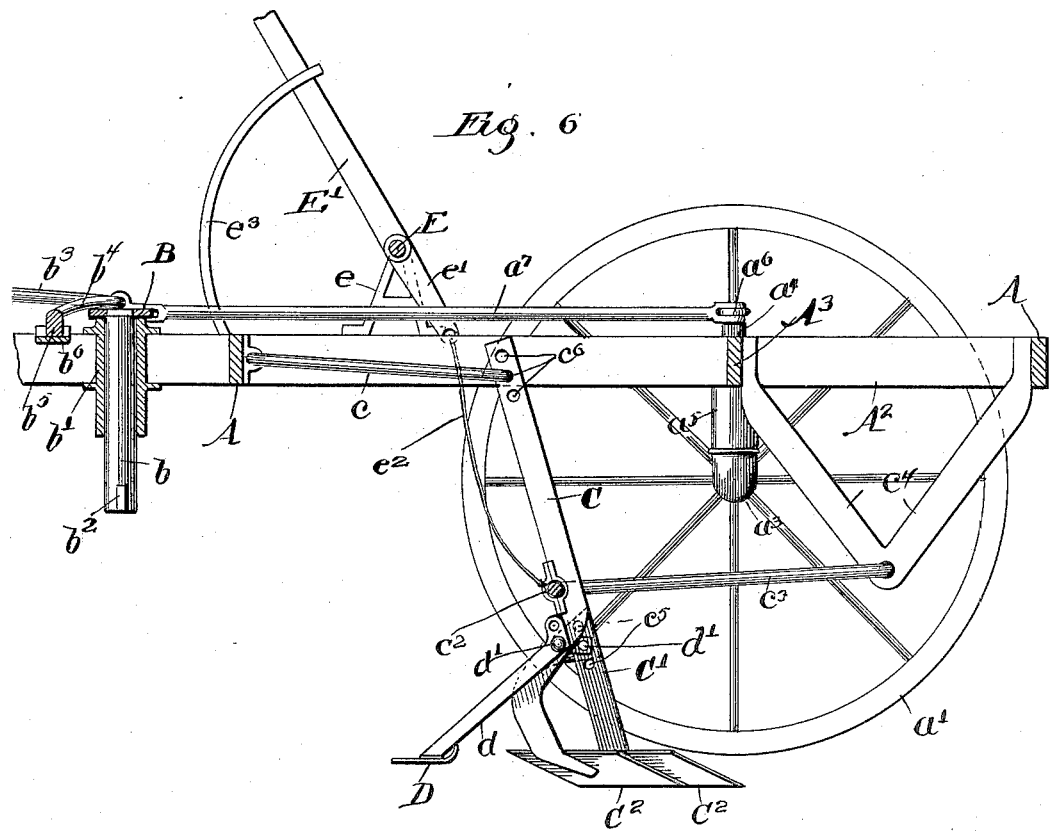
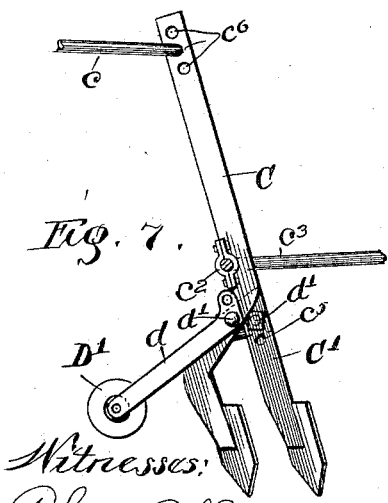
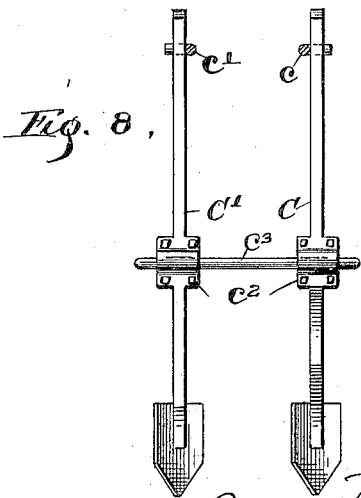
Witnesses:
Chas. A. Hervey
Robert O. Bailey
Inventor:
Cyrus F. Pogue
by Willis Werner Pitner
His Atty.

UNITED STATES PATENT OFFICE.

CYRUS F. POGUE, OF OSWEGO, ILLINOIS.

CULTIVATOR.

SPECIFICATION forming part of Letters Patent No. 599,401, dated February 22, 1898.

Application filed February 1, 1897. Serial No. 621,427. (No model.)

*To all whom it may concern:*

Be it known that I, CYRUS F. POGUE, a citizen of the United States of America, residing at Oswego, in the county of Kendall and State of Illinois, have invented certain new and useful Improvements in Cultivators, of which the following is a specification.

My invention relates to certain improvements in cultivators, the object being to produce a cultivator which may be easily guided and which shall plow the ground at an approximately even depth, which depth, however, may be altered according to the necessity thereof. In plowing the soil around corn it is important to keep the cultivator in a proper course, and one of the features of this invention is to provide a guiding mechanism for the cultivator, so that its direction of motion may be changed without reference to the horses, they being compelled to assume the course taken by the cultivator when so changed. Difficulty has been experienced in keeping the plowshares at an even depth, and I have provided certain means for doing this.

To such end I have devised a cultivator of novel construction and arrangement, a description of which will be found from the following specification and more definitely defined in the claims appended hereto.

In the drawings furnished herewith, Figure 1 is a plan view of a complete cultivator, a portion of the tongues being broken away to shorten the view. Fig. 2 is a side elevation thereof. Fig. 3 is a section in line 3 3, Fig. 2. Fig. 4 is a broken front elevation of the left-hand corner of the cultivator. Fig. 5 is a section through the line 5 5, Fig. 2. Fig. 6 is a detail vertical section through the line 6 6, Fig. 1. Fig. 7 is a side elevation of a modified form of plowshares and share-arms; and Fig. 8 is a rear view thereof, the smoothing device being removed. Figs. 4 to 8, inclusive, are upon an enlarged scale.

In illustrating my invention I have shown a machine for cultivating two rows of corn at a time; but this is immaterial to my invention, as it may be arranged to cultivate a single or greater number of rows, as desired.

A A A' A' represent the main frame of the machine, and $A^2$ $A^3$ auxiliary supporting members, the members $A^2$ extending longitudinally along the middle and carrying at their rear ends a caster-wheel $a$.

Two tongues are shown at $A^4$ and are hinged to the front of the frame in any suitable manner. It is understood that whiffletrees and other draft apparatus may be placed upon the tongues; but the construction and arrangement of these is immaterial. Two main wheels $a'$ support the frame and are journaled upon axles $a^2$, formed upon axle-blocks $a^3$, which have vertically-extending pins $a^4$, journaled in bearings $a^5$, secured upon the members A' A' of the frame of the machine. The bearings $a^5$ are extended downward and rest upon the upper faces of the axle-blocks $a^3$, and the wheels may evidently be swung bodily upon the pins $a^4$, the purpose of which will be hereinafter more fully explained. Two rods or levers $a^6$ extend from the pins $a^4$ toward the middle of the machine and are here connected with links $a^7$ $a^7$, extending rearwardly, to a lever B upon a vertically-extending shaft $b$, which passes through a sleeve $b'$ and carries upon its lower end a foot-bar $b^2$, upon which the driver may rest his feet and at the same time guide the machine therewith.

A pair of handle-bars $b^3$ are pivoted upon the lever B, and are formed with a crank $b^4$, which carries a detent $b^5$, which may be thrown into engagement with a notch $b^6$, secured to the frame. When this detent is in engagement with the notch, the wheels are held parallel with the frame of the machine, and when it is desired to alter the course of the same for any purpose the handle-bars are lifted sufficiently to disengage the detent from the notch, the lever B, swung upon its pivot by means of said handle-bars, turning the wheels $a'$ at an angle to the frame and carrying the machine bodily to one side. When the machine has arrived at the proper point, the wheels may be swung into their normal position and the machine allowed to travel in the ordinary way.

Upon the rear member A of the frame are hinged a series of levers $c$ $c'$, which extend forward, where they are connected to share-arms C C'. These share-arms extend downward and forward at a slight angle and carry upon their lower ends plowshares $C^2$, arranged at an angle to the plane of the share-arms C C', as is customary in cultivators of this class. The share-arms C are preferably bent at their lower ends to bring the plowshare slightly to the rear of the others. The levers $c\ c'$ are arranged in pairs, each pair connecting a pair of share-arms, the upper part of each share-arm being bent into the shape shown in Figs. 1 and 4 and each carrying a plowshare upon its end. About midway between the ends of the share-arms are formed boxes $c^2$, in which are journaled yoke-shaped levers $c^3$, which extend forward and are pivoted in depending brackets $c^4$, which extend to the frame of the machine and are secured thereto. Smoothers D are secured to the arms C C' by means of arms $d$, which are vertically adjustable upon the share-arms, whereby the smoothers may be raised or lowered, as desired, the object of these smoothers being to regulate in a measure the depth at which the plowshares may operate. A series of holes $c^5$ are formed in the share-arms and the arms $d$, provided with bolts $d'$, which may be inserted in either of the holes, depending upon the position at which it is desired to place the smoother. The share-arms are also provided with holes $c^6$ at their upper ends, in which the levers $c\ c'$ are pivoted, these holes being for the purpose of giving vertical adjustment to the share-arms. When the levers $c\ c'$ are pivoted in the uppermost hole $c^6$, the plowshares are permitted to enter the earth to the greatest depth allowed by the adjustment, but when necessary the levers $c\ c'$ may be pivoted in the hole, which permits the plowshare to enter the earth to the depth required. In certain soils this is all that is necessary to keep the shares to a certain depth, but in other soils the smoother is added. It should be noticed that by hanging the share-arms C C', as shown and described, the pull will come upon the levers $c$, $c'$, and $c^3$, thus dividing the strain between these points and at the same time permitting the plowshares to travel in the ground in the most suitable manner.

The smoothers D follow upon the soil which rolls back into the furrow made by the plowshares and permit the shares to enter the ground to a certain depth, which may be varied in accordance with the requirement.

I have provided means for lifting the shares out of the ground when not in use, and, as seen in the drawings, a shaft E is journaled in brackets $e$ upon the frame of the machine and levers $e'$ secured upon said shaft at the proper places. Ropes $e^2$ connect said levers with the transverse member of the yoke-shaped levers $c^3$, and one of the levers is extended from the shaft and formed into an operating-lever E', a segment $e^3$ being provided for the purpose of holding the lever E' at any point desirable. As shown, the lever E' is in a position which allows the shares to fall to their lowest position, and by swinging the lever down the share-arms will be drawn upward until they are clear of the ground.

The modifications shown in Figs. 7 and 8 consist in providing a roller D' in place of a flat smoother, a different kind of plowshare, and a different shape for the upper ends of the share-arms. I am aware that other alterations and modifications are possible and therefore desire not to limit myself to the exact construction shown and described; but

What I claim as new, and desire to secure by Letters Patent, is—

1. The combination with the frame of a cultivator, of a pair of wheels journaled upon axles pivoted upon the frame by means of vertical pivots, an oscillating hand-lever connected with said axles and adapted to swing them upon their pivots, and a detent for holding said lever against such oscillation, said detent being connected with and operated by said hand-lever; substantially as described.

2. The combination in a cultivator, of a frame, a pair of wheels mounted upon axles pivoted to said frame by means of vertical pivots, a hand-lever pivoted upon the frame and adapted to oscillate in two planes, a detent adapted to hold said lever against oscillation and suitable connecting devices between said lever and the axles and detent, respectively, whereby the oscillation of the lever in one plane may swing the axles upon their vertical pivots, and the oscillation of said lever in the other plane may operate the detent; substantially as described.

3. The combination with a cultivator-frame, of share-arms adapted to carry suitable plowshares, a series of rods pivoted at one end to the upper portions of the share-arms and at the other end to the frame back of said arms, and a second series of rods pivoted at one end to said share-arms between their ends and at the other end to the frame in front of said arms; substantially as described.

4. In combination with a cultivator-frame, a series of share-arms adapted to carry the plowshares, a series of rods pivoted at one end to the upper portions of the share-arms and at the other end to the frame in the rear of said share-arms, a second series of rods pivoted at one end to the share-arms between their ends and at the other end to the frame in front of the share-arms and means for raising said share-arms connected thereto by a flexible connection whereby the share-arms may swing freely upon their supporting-rods; substantially as described.

5. A cultivator having a series of share-arms supported by means of two series of rods, the rods of one series being pivoted at one end to the frame back of the share-arms and at the other end to the upper portions of said share-arms, and the rods of the other series being pivoted to the frame at one end in front of the share-arms and at the other end to said share-arms between their ends and the pivotal connection between the share-arms, and one of said series of rods being adjustable longitudinally of said share-arms; substantially as described.

In witness whereof I have hereunto set my hand, at Chicago, in the county of Cook, this 23d day of January, A. D. 1897.

CYRUS F. POGUE.

Witnesses:
 CHAS. O. SHERVEY,
 L. R. POGUE.